Figure 1:
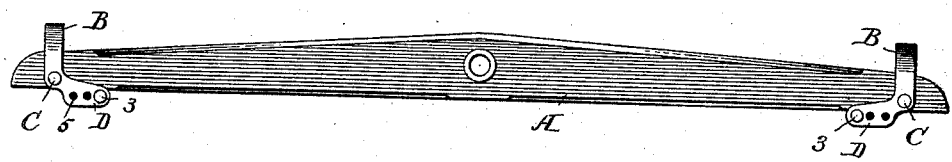

(No Model.)

S. GRAHAM.
DRAFT EQUALIZER.

No. 448,483. Patented Mar. 17, 1891.

WITNESSES

INVENTOR

Attorneys.

UNITED STATES PATENT OFFICE.

SAMUEL GRAHAM, OF LEBECK, MISSOURI.

DRAFT-EQUALIZER.

SPECIFICATION forming part of Letters Patent No. 448,483, dated March 17, 1891.

Application filed November 10, 1890. Serial No. 370,894. (No model.)

*To all whom it may concern:*

Be it known that I, SAMUEL GRAHAM, a citizen of the United States, residing at Lebeck, in the county of Cedar and State of Missouri, have invented certain new and useful Improvements in Draft-Devices; and I do hereby declare the following to be a full, clear, and exact decription of the invention, such as will enable others skilled in the art to which it appertains to make and use the same.

My invention relates to draft devices of that class which are used to compensate for or equalize the unequal draft of a team of horses by causing the points at which the draft is applied to the doubletree or evener to be varied as one or the other horse of the team outpulls the other; and the invention consists of a clevis of novel form, which I will describe in detail hereinafter, and two forms of which are illustrated in the drawings, wherein—

Figure 2:
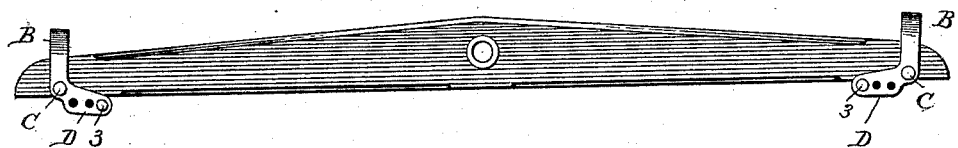
Figure 3:
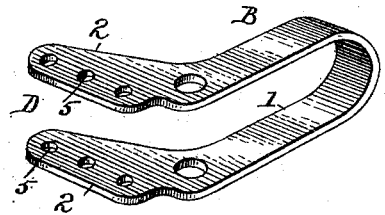
Figure 4:
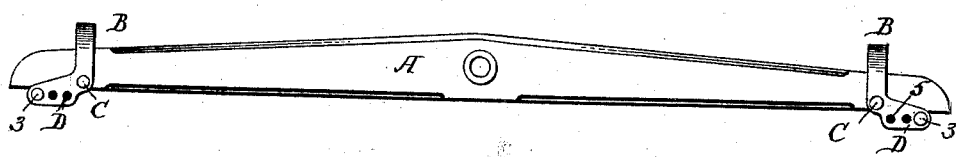
Figure 5:
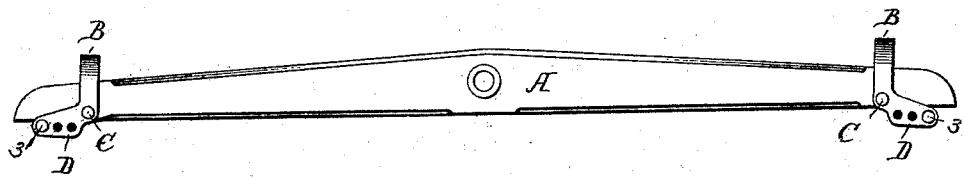

Figure 1 is a plan view of the preferred form of my invention, illustrated as applied to a doubletree and in the position occupied when the team is pulling evenly. Fig. 2 is a similar view showing the position of the parts when one animal is outpulling the other. Fig. 3 is a perspective view of the clevis shown in Figs. 1 and 2; and Figs. 4 and 5 are plan views of another form of my invention, showing the positions assumed by the draft-equalizing clevis when the draft is even and when it is unequal.

In the drawings, A represents the doubletree or evener, and B the draft-equalizing clevises, which are secured to the doubletree near its end, and which constitute the essential feature of my invention. The doubletree has near each end a single perforation, through which passes the bolt or pin C, that connects the clevis to the doubletree, the two arms of the clevis being perforated in the usual manner to permit the passage of this bolt through them. The clevis is provided with a lateral extension D, situated in rear of the bolt-perforations, so that it is adapted to bear upon the rear edge of the doubletree when the doubletree is thrown out of a position at right angles to the line of draft, as when one horse is pulling ahead of the other, and thus change the point at which the draft of one of the horses is applied. In practice I prefer that this lateral extension of the clevis shall be formed of two arms 2 2, one extending from each of the arms 1 of the clevis, connected by a bolt or cross-bar 3, which bears against the edge of the doubletree. This extension may project either inward or outward and be arranged to bear upon the rear edge of the doubletree, either outside of or inside of the points where the bolts C pass through it, and in the drawings I have shown both forms of the invention. In Figs. 1 to 3 the extensions project inward, and this is the preferred form of the invention, as it permits the holes for the passage of the bolts C to be arranged nearer the ends of the doubletree, which is an advantage. The two arms 1 are united at their forward ends, as snown in Fig. 3, there forming a sort of loop, to which the whiffletree, or other means of applying the draft, is attached. It will be observed that this forward extending portion of the clevis to which the draft devices are secured is in line with the holes for the bolt, by which the clevis is secured to the doubletree, so that normally the draft is directly upon this bolt. It will be seen from an examination of Figs. 1 and 4 that when the evener or doubletree B is at right angles to the line of draft, which indicates that the team is pulling evenly, the extensions D do not bear upon the doubletree at all, and hence the draft is applied to the doubletree through the bolts C only. When, however, one horse outpulls the other, the doubletree assumes a position like that illustrated in Figs. 2 and 5, the forward extending portion of the doubletree being that to which the stronger horse is hitched.

When the equalizing-clevis is of the form shown in Figs. 1 to 3, and one horse outpulls the other, the extension D of the clevis to which the stronger horse is hitched is drawn against the rear face of the doubletree between the hole for the bolt C and the center of the doubletree, thus shortening the leverage of the stronger horse. On the other hand, the extension D of the other clevis will be moved away from the rear face of the doubletree, so that the leverage of this the weaker horse will not be changed. This position of parts is indicated in Fig. 2, from which it will be seen that the stronger horse, as soon as he begins to outpull the other, is put to a disadvantage by shortening, in effect, the arm of the doubletree to which he is secured, and thus he will be less able to pull ahead of the other horse, so the doubletree will be maintained in an even position across the line of draft; and this even position is maintained by the use of my invention, whether the horses pull alike or either one pulls more than the other, as will be understood without further description.

Instead of putting the stronger horse to a disadvantage, as is done by the construction just described, the weaker horse may be given an advantage by increasing practically the length of the doubletree-arm to which he is secured, while the length of the other arm remains constant. This may be accomplished by the use of a clevis like that shown in Figs. 4 and 5, wherein the extension D projects outward toward the ends of the doubletree rather than inward. In the use of this form of the invention, when the doubletree is pulled into an oblique position across the line of draft, the lateral arm D of the clevis to which the weaker horse is secured is drawn against the face of the doubletree outside of the pin C, thus increasing the leverage on this side of the doubletree, as will be understood, and as is illustrated in Fig. 5. I prefer that the extensions D should be elongated and provided with a series of apertures 5, through any of which the bolt or pin 3 may be passed. This gives a certain degree of adjustability to the device, as the point at which the extension D contacts with the rear face of the doubletree is governed by the position of the pin 3.

The form of lateral extension D of the clevis which I have shown and described—that is, consisting of the two arms or plates 2 and the bar or bolt 3—while that which I prefer to make use of is not the only form in which my invention might be embodied, as the extension might be carrried by either one of the two plates or arms 1 of the clevis and still operate successfully, though it would lack the strength which the construction shown possesses.

This equalizing device is exceedingly simple in construction and operation, and by making it adjustable, as described, it may be made to equalize the draft of animals which vary greatly or but little in strength.

In using my draft-equalizing clevis it is necessary to make but a single perforation through the doubletree near each end, which reduces the weakening thereof to a minimum.

What I claim is—

1. In combination with a doubletree, a draft-equalizing clevis secured thereto by a bolt, having a forward-projecting portion in line with the said bolt to which the draft devices are secured, and a laterally-extending portion in rear of the said bolt and adapted to bear against the rear edge of the doubletree when the latter is pulled oblique to the line of draft, substantially as described.

2. In combination with a doubletree, a draft-equalizing clevis secured thereto by a bolt, and having two forward-projecting arms through which the said bolt passes and to which the draft devices are secured, and a lateral extension in rear of the said bolt, consisting of an arm or plate carried by each arm of the clevis, and a connecting bolt or bar between such arms adapted to bear against the rear edge of the doubletree, substantially as shown and described.

3. In combination with a doubletree, a draft-equalizing clevis secured thereto and having a forward-extending portion to which the draft devices are secured, and a lateral extension in rear of the doubletree, provided with a series of apertures and a bolt or pin adapted to be passed through the said apertures and to engage with the rear edge of the doubletree when it is oblique to the line of draft, substantially as shown and described.

In testimony whereof I affix my signature in presence of two witnesses.

SAMUEL GRAHAM.

Witnesses:
WM. S. MARTIN,
H. B. SLOENS.